United States Patent [19]

Sugimori et al.

[11] Patent Number: 5,179,139

[45] Date of Patent: Jan. 12, 1993

[54] DIHYDROXYBIPHENYL-ADVANCED EPOXY RESIN BLENDS

[75] Inventors: Masahiro Sugimori; Hisashi Tada; Kazuya Goto, all of Aichi; Masahiro Saruta, Hiroshima, all of Japan

[73] Assignee: Mitsubishi Rayon Co., Ltd., Tokyo, Japan

[21] Appl. No.: 759,652

[22] Filed: Sep. 13, 1991

Related U.S. Application Data

[63] Continuation of Ser. No. 425,914, Oct. 24, 1989, abandoned.

[30] Foreign Application Priority Data

Oct. 24, 1988 [JP] Japan .................. 63-266119
Nov. 15, 1988 [JP] Japan .................. 63-286724

[51] Int. Cl.⁵ .................. C08K 7/06; C08K 7/14; B32B 17/04; B32B 27/04
[52] U.S. Cl. .................. 523/428; 428/415; 525/524; 525/526
[58] Field of Search .......... 525/524, 526; 523/428; 428/415

[56] References Cited

U.S. PATENT DOCUMENTS 3,523,037  8/1970  Chellis .................. 525/524
3,843,565 10/1974  Yamamoto et al. .......... 525/524
4,311,753  1/1982  Pucci .................... 525/524
4,588,778  5/1986  Nir et al. ............... 525/108
4,756,848  7/1988  Tieke et al. ............. 525/529

FOREIGN PATENT DOCUMENTS 0211382  2/1987  European Pat. Off. .
1581068  9/1969  France .
62-207322  9/1987  Japan ................... 525/524
63-10618  1/1988  Japan .
2208231  3/1989  United Kingdom .

Primary Examiner—Robert E. Sellers
Attorney, Agent, or Firm—Oblon, Spivak, McClelland, Maier & Neustadt

[57] ABSTRACT

An epoxy resin composition used as a matrix for a fiber-reinforced composite is disclosed, which comprises the following components:
(A) a bifunctional epoxy resin;
(B) at least one of a trifunctional epoxy resin and a tetrafunctional epoxy resin;
(C) a dihydroxybiphenyl compound represented by the following general formula:

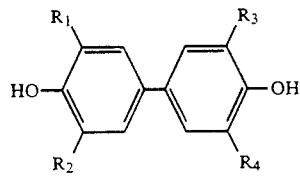

wherein $R_1$, $R_2$, $R_3$ and $R_4$, which may be the same or different, each represents a hydrogen atom or an alkyl group having 1 to 6 carbon atoms; and
(D) an aromatic amine, wherein said components (A), (B), (C) and (D) are used in amounts satisfying the following conditions:

$$1/0.1 \geq a/b \geq 1/1.2$$

$$10/1 \geq (a+b)/c \geq 1/1$$

$$1/0.8 \geq (a+b-c)/d \geq 1/1.5$$

wherein a represents the molar number of epoxy groups in component (A), b represents the molar number of epoxy groups in component (B), c represents the molar number of phenolic OH groups in component (C) and d represents the molar number of NH groups in component (D).

4 Claims, No Drawings

DIHYDROXYBIPHENYL-ADVANCED EPOXY RESIN BLENDS

This application is a continuation of application Ser. No. 07/425,914 filed on Oct. 24, 1989, now abandoned.

FIELD OF THE INVENTION

The present invention relates to an epoxy resin composition improved in storage stability, hot wet property and mechanical properties such as elongation. Composite materials prepared from this epoxy resin composition are suitable for use in aircraft, automobiles and other industrial applications.

BACKGROUND OF THE INVENTION

Because of their excellent adhesion and rigidity properties, epoxy resins have been used extensively as matrix resins for composite materials. In particular, bisphenol A epoxy resins are used most commonly because of their good handling property and balanced physical properties but their use is limited to applications where high heat resistance is not required. Compositions chiefly composed of N,N,N',N'-tetraglycidyl diaminodiphenylmethane and 4,4'-diaminodiphenyl sulfone have been used extensively in applications where high heat resistance is required. In spite of their high heat resistance and rigidity, the use of these compositions is again limited by their low elongation and toughness. With a view to solving this problem, the present inventors previously proposed a novel improved epoxy resin composition in Unexamined Published Japanese Patent Application (JP-A) No. 63-10618.

SUMMARY OF THE INVENTION

The present inventors conducted intensive studies in order to develop an epoxy resin that is improved not only in storage stability, handling property and heat resistance but also in mechanical properties such as toughness and elongation and as a result, they have accomplished the present invention.

The present invention relates to an epoxy resin composition which comprises the following components:
(A) a bifunctional epoxy resin;
(B) at least one of a trifunctional epoxy resin and a tetrafunctional epoxy resin;
(C) a dihydroxybiphenyl compound represented by the following general formula:

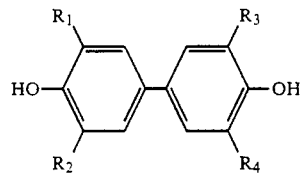

wherein $R_1$, $R_2$, $R_3$ and $R_4$, which may be the same or different, each represents a hydrogen atom or an alkyl group having 1 to 6 carbon atoms; and
(D) an aromatic amine,
wherein the components (A), (B), (C) and (D) are used in amounts satisfying the following conditions:

$$1/0.1 \geq a/b \geq 1/1.2$$

$$10/1 \geq (a+b)/c \geq 1/1$$

$$1/0.8 \geq (a+b-c)/d \geq 1/1.5$$

wherein a represents the molar number of epoxy groups in component (A), b represents the molar number of epoxy groups in component (B), c represents the molar number of phenolic OH groups in component (C) and d represents the molar number of NH groups in component (D).

DETAILED DESCRIPTION OF THE INVENTION

Examples of the bifunctional epoxy resin of component (A) used in the present invention include a bisphenol epoxy type resin such as a bisphenol A epoxy resin, a bisphenol F epoxy resin, brominated products thereof, and a bisphenol S epoxy resin. For example, bisphenol epoxy type resin is represented by the following general formula:

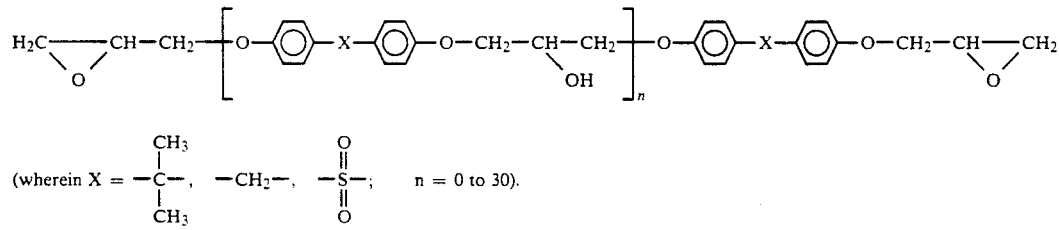

For providing improved toughness, a bisphenol A epoxy resin or a bisphenol F epoxy resin is desirably used as a major component.

The ratio of epoxy groups in the epoxy resin (A) to those in the trifunctional and/or tetrafunctional epoxy resin (B) is in the range of 1/0.1 to 1/1.2, preferably 1/0.2 to 1/1.0, when expressed by a/b. If the ratio is greater than 1/0.1, the resistance of the final resin composition to hot water and chemicals is reduced. If the ratio is smaller than 1/1.2, toughness is so much reduced as to cause a decrease not only in the efficiency of the use of reinforcing materials but also in the compressive strength of the final resin composition after impact.

Component (B) of the resin composition of the present invention is a trifunctional or tetrafunctional epoxy resin which may be used either on their own or as an admixture. Illustrative trifunctional epoxy resins include N,N,O-triglycidyl-p-aminophenol, N N,O-triglycidyl-m-aminophenol, N,N,O-triglycidyl-4-aminom-cresol, N,N,O-triglycidyl-5-amino-o-cresol, and 1,1,1-(triglycidyl-oxyphenyl)methane. Among these, N,N,O-triglycidyl compounds are particularly preferred to provide improved solvent resistance. Examples of the tetrafunctional epoxy resin that can be used as component (B) include N,N,N',N'-tetraglycidyldiaminodiphenylmethane, N,N,N',N'-tetraglycidyl-4,4'-(4-aminophenyl)-p-diisopropylbenzene and 1,1,2,2-(tetraglycidyloxyphenyl)ethane.

Examples of the 4,4'-dihydroxybiphenyl compound to be used as component (C) in the present invention include 4,4'-dihydroxybiphenyl and 4,4'-dihydroxy-3,3',5,5'-tetratert-butylbiphenyl.

The amount of use of component (C) is determined in such a way that the proportions of components (A), (B) and (C) satisfy the condition:

$$10/1 \geq (a+b)/c \geq 1/1$$

wherein a, b and c are defined above. If the ratio defined above exceeds 10/1, it sometimes occurs that the final resin composition does not have satisfactory wet heat resistance or toughness. If the ratio is smaller than 1/1, heat and solvent resistance is reduced to an undesirably low level. The preferred range is from 10/1 to 1.5/1.

Examples of the aromatic amine used as component (D) in the present invention include 4,4'-diaminodiphenyl sulfone, 3,3'-diaminodiphenyl sulfone, 4,4'-diaminodiphenylmethane, 4,4'-diaminodiphenylether and trimethylene-bis(4-aminobenzoate). Among these, 4,4'-diaminodiphenyl sulfone and 3,3'-diaminodiphenyl sulfone are particularly preferred. Depending on the purpose of use, a cure accelerator may be used in combination with component (D). Specific examples of the cure accelerator include boron trifluoride amine complexes such as boron trifluoride monoethylamine complex, imidazoles, etc.

The amount of use of the component (D) is determined in such a way that the proportions of components (A)–(D) satisfy the condition:

$$1/0.8 \geq (a+b-c)/d \geq 1/1.5$$

wherein a, b, c and d are defined as above. A particularly preferred range is from 1/0.9 to 1/1.2. If the ratio defined above is greater than 1/0.8, the resin composition will cure insufficiently to provide satisfactory solvent and heat resistance. If the ratio is less than 1/1.5, water and solvent resistance will decrease to an undesirably low level.

In a preferred embodiment of the present invention, component (C) (dihydroxybiphenyl compound) is allowed to react preliminary with all or part of component (A) (bifunctional epoxy resin) and all of component (B) (trifunctional and/or tetrafunctional epoxy resin) under such conditions that at least 80%, preferably at least 90%, of the phenolic OH groups in component (C) react with the epoxy groups in components (A) and (B). If less than 80% of the phenolic OH groups reacts with the epoxy groups, the preliminary reaction will offer no benefit.

The molar ratio between epoxy groups in components (A) and (B) to be used in the preliminary reaction is within the range of from 1/0.3 to 1/3.0, preferably from 1/0.5 to 1/2.0. If the ratio is greater than 1/0.3, it sometimes occurs that the final resin composition does not have satisfactory resistance to hot water and solvents. If the ratio is smaller than 1/3.0, gelation can occur during the preliminary reaction.

The amount of component (C) to be used in the preliminary reaction is determined in such a way that the proportions of components (A), (B) and (C) to be used in the preliminary reaction satisfy the condition:

$$5/1 \geq (a+b)/c \geq 0.9/1$$

wherein a, b and c are defined above. If the ratio defined above is greater than 5/1, satisfactory wet heat resistance cannot be attained. If the ratio is smaller than 0.9/1, the preliminary reaction will not proceed efficiently on account of increased viscosity.

The epoxy resin composition of the present invention permits the use of another epoxy resin as component (E) in an amount that will not upset the overall balance between various physical properties of the composition. A typical example of such additional epoxy resin is a novolak epoxy resin. The amount of component (E), if used at all, preferably does not exceed 20% of the total weight of the epoxy resin components (A), (B) and (E). If component (E) is to be used, the proportions of components (A), (B), (C), (D) and (E) must satisfy the following conditions:

$$1/0.1 \geq a/b \geq 1/1.2$$

$$1/0.1 \geq (a+b+e)/c \geq 1/0.9$$

$$1/0.8 \geq (a+b+e-c)/d \geq 1/1.5$$

wherein a, b, c and d are defined above and e is the molar number of epoxy groups in component (E).

The resin composition of the present invention may optionally contain an elastomeric component such as a butadiene-acrylonitrile copolymer terminated with a carboxyl group at both ends, or a thermoplastic resin component such as polyether sulfone, polysulfone, polyether ether ketone, polyether imide or polyvinyl butyrate. The amounts in which these optional components are used may be appropriately determined within the range that will not upset the overall balance between various properties of the final resin composition.

The resin composition of the present invention may also contain inorganic compounds as required and illustrative inorganic compounds that can be incorporated in the resin composition include silica powders, aerosils, micro-baloons and antimony trioxide.

The resin composition of the present invention serves as an excellent matrix resin for composite materials, thus providing composite materials having improved properties such as high resistance to heat, water and impact. The composite materials produced may be reinforced with carbon fibers, glass fibers, aramid fibers, boron fibers, silicon carbide fibers, etc. These reinforcing fibers may be used in various forms such as milled fibers, chopped fibers, continuous fibers and textiles.

The following examples are provided for the purpose of further illustrating the present invention but are in no way to be taken as limiting. In the examples, all "parts" are on a weight basis and the "molar ratio" refers to that of functional groups.

EXAMPLES 1 TO 6 AND COMPARATIVE EXAMPLES 1 TO 6

A hundred parts of Epikote 807 (the trade name of Yuka-Shell Epoxy Co., Ltd. for bisphenol F epoxy resin; epoxy equivalent, 170), 16.6 parts of N,N,O-triglycidyl-p-aminophenol (epoxy equivalent, 94), 14.2 parts of 4,4'-dihydroxybiphenyl, and 37.9 parts of 4,4'-diaminodiphenyl sulfone were mixed well in a kneader at 60° C. to form a resin composition (I).

This composition was sandwiched between glass sheets and cured at 180° C. for 2 hours to prepare a resin sheet. The flexural strength, elastic modulus, elongation and Tg (according to thermomechanical analysis (TMA) method) of the resin sheet were evaluated in accordance with JIS K6911. The results are shown in Table 1.

The following compounds were used as components (A)–(D).

(A): Epikote 807
(B): N,N,O-triglycidyl-p-aminophenol
(C): 4,4'-dihydroxybiphenyl The results are also shown in Table 2. The symbols used in Table 2 have the following meanings.

A-1: Epikote 807
A-2: 2:1 (by mole) mixture of Epikote 807 and Epikote 828 which is the trade name of Yuka-Shell Epoxy Co., Ltd. for a bisphenol A diglycidyl ether type epoxy resin; epoxy equivalent, 188)
B-1: N,N,O-triglycidyl-p-aminophenol
B-2: N,N,O-triglycidyl-m-aminophenol
B-3: N,N,O-triglycidyl-4-amino-m-cresol
B-4: N,N,O-triglycidyl-5-amino-o-cresol
B-5: 1,1,1-(triglycidyloxyphenyl)methane
B-6: N,N,N',N'-tetraglycidyldiaminodiphenylmethane
C-1: 4,4'-dihydroxybiphenyl
C-2: 4,4'-dihydroxy-3,3',5,5'-tetra-tertbutylbiphenyl
D-1: 4,4'-diaminodiphenyl sulfone
D-2: 3,3'-diaminodiphenyl sulfone

TABLE 2

| Example No. | Component (A) | (B) | (C) | (D) | a/b | (a + b)/c | (a + b − c)/d | Tg (°C.) | Flexural elongation (%) | Flexural strength (kg/mm$^2$) | Flexural elastic modulus (kg/mm$^2$) |
|---|---|---|---|---|---|---|---|---|---|---|---|
| Example |
| 7 | A-2 | B-1 | C-1 | D-1 | 1/0.6 | 4/1 | 1/1 | 149 | 16.6 | 23.8 | 324 |
| 8 | A-1 | B-2 | C-1 | D-1 | 1/0.3 | 5/1 | 1/1 | 147 | 17.0 | 24.2 | 326 |
| 9 | A-1 | B-3 | C-1 | D-1 | 1/0.3 | 5/1 | 1/1 | 148 | 17.5 | 24.7 | 322 |
| 10 | A-1 | B-4 | C-1 | D-1 | 1/0.3 | 5/1 | 1/1 | 146 | 16.4 | 23.9 | 324 |
| 11 | A-1 | B-5 | C-1 | D-1 | 1/0.3 | 5/1 | 1/1 | 145 | 16.5 | 24.1 | 321 |
| 12 | A-1 | B-1 | C-2 | D-1 | 1/0.3 | 5/1 | 1/1 | 143 | 16.0 | 24.6 | 360 |
| 13 | A-1 | B-3 | C-2 | D-1 | 1/0.3 | 5/1 | 1/1 | 144 | 16.2 | 24.3 | 365 |
| 14 | A-1 | B-1 | C-1 | D-2 | 1/0.3 | 5/1 | 1/1 | 150 | 16.6 | 23.6 | 325 |
| 15 | A-1 | B-1/B-6 = 2/1 | C-1 | D-1 | 1/0.3 | 5/1 | 1/1 | 152 | 15.8 | 23.9 | 340 |

(D): 4,4'-diaminodiphenyl sulfone

The symbols a, b, c and d used in Table 1 have the same meanings as already defined.

As is seen from the results of Table 1, Examples of the present invention show high Tg and high elongation, while Comparative Examples show low Tg (Comparative Examples 1, 4, 5 and 6) and/or low elongation (Comparative Examples 2, 3, 5 and 6).

TABLE 1

| Example No. | a/b | (a + b)/c | (a + b − c)/d | Tg (°C.) | Flexural elongation (%) | Flexural strength (kg/mm$^2$) | Flexural elastic modulus (kg/mm$^2$) |
|---|---|---|---|---|---|---|---|
| Example |
| 1 | 1/0.3 | 5/1 | 1/1 | 148 | 16.8 | 23.5 | 320 |
| 2 | 1/0.8 | 5/1 | 1/1 | 155 | 14.3 | 24.7 | 325 |
| 3 | 1/0.3 | 2/1 | 1/1 | 143 | 17.0 | 23.5 | 319 |
| 4 | 1/0.8 | 2/1 | 1/1 | 152 | 14.9 | 24.1 | 322 |
| 5 | 1/0.3 | 5/1 | 1/1.2 | 146 | 18.0 | 23.7 | 321 |
| 6 | 1/0.3 | 5/1 | 1/0.8 | 145 | 16.6 | 23.8 | 320 |
| Comparative Example |
| 1 | 1/0.05 | 5/1 | 1/1 | 119 | 17.0 | 22.5 | 310 |
| 2 | 1/1.3 | 5/1 | 1/1 | 156 | 9.2 | 23.2 | 340 |
| 3 | 1/0.3 | 20/1 | 1/1 | 151 | 8.8 | 20.5 | 331 |
| 4 | 1/0.3 | 0.8/1 | 1/1 | 125 | 15.5 | 19.8 | 319 |
| 5 | 1/0.3 | 5/1 | 1/0.3 | 101 | 7.9 | 16.5 | 299 |
| 6 | 1/0.3 | 5/1 | 1/1.6 | 105 | 8.5 | 17.0 | 302 |

EXAMPLES 7 TO 15

A resin composition and a resin sheet were prepared as in Example 1 except that the compounds shown in Table 2 as components (A)–(D). The resin sheet was subjected to the same tests as conducted in Example 1.

EXAMPLE 16

Thirty parts of Epikote 807 (component (A)), 16.6 parts of N,N,O-triglycidyl-p-aminophenol (component (B)) and 14.2 parts of 4,4'-dihydroxybiphehyl (component (C)) were subjected to a preliminary reaction for 2 hours at 130° C. and thereafter cooled to 60° C. The remaining 70 parts of Epikote 807 (component (A')) and 37.9 parts of 4,4'-diaminodiphenyl sulfone (component (D)) were added to the cooled mixture and the ingredients were mixed well in a kneader (held at 60° C.) to prepare a resin composition (II). This resin composition was tested as in Example 1. The results are shown in Table 3.

EXAMPLES 17 TO 23

Tests were conducted on the samples that were prepared as in Example 16 except that the proportions of the respective components used in the preliminary reaction and the degree of this reaction (conversion of phenolic OH groups) were changed as shown in Table 3. The results are also shown in Table 3, wherein the symbol a' denotes the molar number of epoxy groups in component (A') and the other symbols used have the same meanings as already defined.

epoxy equivalent of 120) and that the proportions of components A, B, C and D were changed to those indicated in Table 4. The results are shown in Table 4.

As is seen from the results of Table 4, Examples of the present invention show high Tg as well as high elongation, while Comparative Examples show low Tg (Comparative Examples 7, 10, 11 and 12) and/or low elongation (Comparative Examples 8, 9, 11 and 12).

TABLE 4

| Example No. | Component (A) | (B) | (C) | (D) | a/b | (a + b)/c | (a + b − c)/d | Tg (°C.) | Flexural elongation (%) | Flexural strength (kg/mm²) | Flexural elastic modulus (kg/mm²) |
|---|---|---|---|---|---|---|---|---|---|---|---|
| Example |  |  |  |  |  |  |  |  |  |  |  |
| 24 | A-1 | B-6 | C-1 | D-1 | 1/0.3 | 5/1 | 1/1 | 147 | 16.5 | 23.3 | 321 |
| 25 | A-1 | B-6 | C-1 | D-1 | 1/0.8 | 5/1 | 1/1 | 153 | 14.2 | 24.5 | 324 |
| 26 | A-1 | B-6 | C-1 | D-1 | 1/0.3 | 2/1 | 1/1 | 143 | 17.1 | 23.2 | 320 |
| 27 | A-1 | B-6 | C-1 | D-1 | 1/0.8 | 2/1 | 1/1 | 149 | 15.0 | 24.0 | 321 |
| 28 | A-1 | B-6 | C-1 | D-1 | 1/0.3 | 5/1 | 1/1.2 | 144 | 18.0 | 23.5 | 322 |
| 29 | A-1 | B-6 | C-1 | D-1 | 1/0.3 | 5/1 | 1/0.8 | 145 | 16.5 | 23.7 | 319 |
| Comparative Example |  |  |  |  |  |  |  |  |  |  |  |
| 7 | A-1 | B-6 | C-1 | D-1 | 1/0.05 | 5/1 | 1/1 | 118 | 16.8 | 22.3 | 309 |
| 8 | A-1 | B-6 | C-1 | D-1 | 1/1.3 | 5/1 | 1/1 | 155 | 9.0 | 23.3 | 335 |
| 9 | A-1 | B-6 | C-1 | D-1 | 1/0.3 | 20/1 | 1/1 | 152 | 8.5 | 20.4 | 332 |
| 10 | A-1 | B-6 | C-1 | D-1 | 1/0.3 | 0.8/1 | 1/1 | 121 | 15.2 | 19.9 | 320 |
| 11 | A-1 | B-6 | C-1 | D-1 | 1/0.3 | 5/1 | 1/0.3 | 98 | 7.7 | 16.3 | 293 |
| 12 | A-1 | B-6 | C-1 | D-1 | 1/0.3 | 5/1 | 1/0.6 | 103 | 8.3 | 16.8 | 300 |

TABLE 3

| Example No. | Preliminary reaction | | reaction conditions (degree of reaction)* | Overall | | | Tg (°C.) | Flexural elongation (%) | Flexural strength (kg/mm²) | Flexural elastic modulus (kg/mm²) |
|---|---|---|---|---|---|---|---|---|---|---|
|  | a/b | (a + b)/c |  | (a + a')/b | (a + a' + b)/c | (a + a' + b − c)/d |  |  |  |  |
| Example 16 | 1/1 | 2.33/1 | 130° C. × 2 h (95%) | 1/0.3 | 5/1 | 1/1 | 149 | 17.0 | 23.4 | 317 |
| Example 17 | 1/1 | 1.15/1 | 130° C. × 2 h (95%) | 1/0.3 | 2.5/1 | 1/1 | 145 | 17.2 | 23.2 | 318 |
| Example 18 | 1/2 | 1.79/1 | 130° C. × 2 h (95%) | 1/0.3 | 5/1 | 1/1 | 150 | 17.5 | 23.5 | 320 |
| Example 19 | 1/0.5 | 3.45/1 | 130° C. × 2 h (95%) | 1/0.3 | 5/1 | 1/1 | 147 | 17.0 | 23.1 | 318 |
| Example 20 | 1/1 | 3.70/1 | 130° C. × 2 h (95%) | 1/0.6 | 5/1 | 1/1 | 144 | 16.8 | 23.2 | 321 |
| Example 21 | 1/1 | 1.89/1 | 130° C. × 2 h (95%) | 1/0.6 | 2.5/1 | 1/1 | 148 | 16.9 | 23.5 | 320 |
| Example 22 | 1/1 | 2.33/1 | 120° C. × 2 h (80%) | 1/0.3 | 5/1 | 1/1 | 144 | 16.3 | 22.9 | 315 |
| Example 23 | 1/1 | 2.33/1 | 130° C. × 4 h (98%) | 1/0.3 | 5/1 | 1/1 | 149 | 17.9 | 23.3 | 318 |

*Degree of the reaction of the phenolic OH groups in component (C) with the epoxy groups in components (A) and (B)

EXAMPLES 24 TO 29 AND COMPARATIVE EXAMPLES 7 TO 12

Tests were conducted on the samples that were prepared as in Example 1 except that component B was replaced by N,N,N',N'-tetraglycidyldiaminodiphenylmethane (tetrafunctional epoxy resin with an

EXAMPLES 30 TO 35

Tests were conducted on the samples that were prepared as in Example 1 except that components A, B, C and D were changed to those shown in Table 5. The results are shown in Table 5, in which B-7 denotes N,N,N',N'-tetraglycidyl-4,4'-(4-aminophenyl)-p-diisopropylbenzene, and the other symbols used have the same meanings as already defined above.

TABLE 5

| Example No. | Component (A) | (B) | (C) | (D) | a/b | (a + b)/c | (a + b − c)/d | Tg (°C.) | Flexural elongation (%) | Flexural strength (kg/mm²) | Flexural elastic modulus (kg/mm²) |
|---|---|---|---|---|---|---|---|---|---|---|---|
| Example |  |  |  |  |  |  |  |  |  |  |  |
| 30 | A-2 | B-6 | C-1 | D-1 | 1/0.6 | 4/1 | 1/1 | 147 | 16.7 | 23.9 | 320 |
| 31 | A-1 | B-7 | C-1 | D-1 | 1/0.3 | 5/1 | 1/1 | 144 | 16.2 | 24.0 | 323 |
| 32 | A-1 | B-6 | C-2 | D-1 | 1/0.3 | 5/1 | 1/1 | 143 | 15.9 | 24.2 | 355 |

TABLE 5-continued

| Example No. | Component | | | | a/b | (a + b)/c | (a + b − c)/d | Tg (°C.) | Flexural elongation (%) | Flexural strength (kg/mm²) | Flexural elastic modulus (kg/mm²) |
|---|---|---|---|---|---|---|---|---|---|---|---|
| | (A) | (B) | (C) | (D) | | | | | | | |
| 33 | A-2 | B-6 | C-2 | D-1 | 1/0.3 | 5/1 | 1/1 | 145 | 16.4 | 24.1 | 361 |
| 34 | A-1 | B-6 | C-1 | D-2 | 1/0.3 | 5/1 | 1/1 | 149 | 16.3 | 23.7 | 330 |
| 35 | A-1 | B-6/B-1 = 2/1 | C-1 | D-1 | 1/0.3 | 5/1 | 1/1 | 150 | 15.6 | 23.7 | 337 |

EXAMPLES 36 TO 43

Tests were conducted on the samples that were prepared as in Example 16 except that N,N,N',N'-tetraglycidyldiaminodiphenylmethane was used as component (B) and that the proportions of components A, B, C and D were changed to those shown in Table 6. The results are shown in Table 6.

TABLE 6

| Example No. | Preliminary reaction | | reaction conditions (degree of reaction)* | Overall | | | Tg (°C.) | Flexural elongation (%) | Flexural strength (kg/mm²) | Flexural elastic modulus (kg/mm²) |
|---|---|---|---|---|---|---|---|---|---|---|
| | a/b | (a + b)/c | | (a + a')/b | (a + a' + b)/c | (a + a' + b − c)/d | | | | |
| Example 36 | 1/1 | 2.33/1 | 130° C. × 2 h (95%) | 1/0.3 | 5/1 | 1/1 | 148 | 17.1 | 24.2 | 319 |
| Example 37 | 1/1 | 1.15/1 | 130° C. × 2 h (95%) | 1/0.3 | 2.5/1 | 1/1 | 143 | 17.3 | 23.1 | 317 |
| Example 38 | 1/2 | 1.79/1 | 130° C. × 2 h (95%) | 1/0.3 | 5/1 | 1/1 | 148 | 17.4 | 23.4 | 321 |
| Example 39 | 1/0.5 | 3.45/1 | 130° C. × 2 h (95%) | 1/0.3 | 5/1 | 1/1 | 145 | 17.1 | 23.3 | 318 |
| Example 40 | 1/1 | 3.70/1 | 130° C. × 2 h (95%) | 1/0.6 | 5/1 | 1/1 | 146 | 16.8 | 23.4 | 319 |
| Example 41 | 1/1 | 1.89/1 | 130° C. × 2 h (95%) | 1/0.6 | 2.5/1 | 1/1 | 149 | 17.0 | 23.6 | 321 |
| Example 42 | 1/1 | 2.33/1 | 120° C. × 2 h (80%) | 1/0.3 | 5/1 | 1/1 | 145 | 16.2 | 22.7 | 315 |
| Example 43 | 1/1 | 2.33/1 | 130° C. × 4 h (98%) | 1/0.3 | 5/1 | 1/1 | 147 | 16.8 | 23.4 | 317 |

*Degree of the reaction of the phenolic OH groups in component (C) with the epoxy groups in components (A) and (B)

EXAMPLE 44

The resin composition (I) prepared in Example 1 was impregnated in unidirectionally collimated carbon fibers (Pyrofil ® M-1 of Mitsubishi Rayon Co., Ltd.) by a hot-melt process to prepare a unidirectional prepreg having a fiber areal weight of 145 g/m² and a resin content of 35 wt %. Sheets of this prepreg were laid up to unidirectional laminate $(0°)_{16}$ and quasi-isotropical laminate $[+45°/0°/-45°/+90°]_{4s}$, and cured at 180° C. for 2 hours to prepare a composite material. The characteristics of the composite material (i.e., 0° compressive strength at 82° C. after water absorption, and compressive strength at room temperature after impact) were evaluated by the following methods. The test results were normalized for a fiber volume fraction of 60%.

Hot Wet Property

A $(0°)_{16}$ laminated composite was submerged in hot water at 71° C. for 14 days and thereafter subjected to a compression test in the direction of 0° at 82° C. in accordance with ASTM D-695.

Impact Resistance

In accordance with NASA RP 1092, a panel (4×6×0.18 in.) was fixed on a table with a hole (3×5 in.); a weight of 4.9 kg with a ½ inch radius nose was dropped on the center of the panel to give an impact of 1,500 lbs. per inch of panel thickness, and the panel was thereafter subjected to a compression test. The results of these evaluations are shown in Table 7.

EXAMPLES 45 TO 53

Tests were conducted on the samples that were prepared as in Example 44 except that the resin compositions to be used were changed to those shown in Table 7. The results are shown in Table 7.

EXAMPLE 54

Resin composition (III) was prepared as in Example 1 except that 15.0 parts of powdered polyether sulfone was further mixed with the components described in Example 1. Tests were conducted on the sample that was prepared as in Example 44 except that resin composition (III) was used in place of resin composition (I). The results are shown in Table 7.

EXAMPLE 55

Resin composition (IV) was prepared as in Example 1 except that 15.0 parts of powdered polyether sulfone was further mixed with the components described in Example 24. Tests were conducted on the samples that were prepared as in Example 44 except that resin composition (IV) was used in place of resin composition (I). The results are shown in Table 7.

TABLE 7

| Example No. | Resin Composition | 0° compressive strength at 82° C. after water absorption (kg/mm²) | Compressive strength at R.T. after impact (kg/mm²) |
| --- | --- | --- | --- |
| 44 | as prepared in Example 1 | 116 | 32 |
| 45 | as prepared in Example 9 | 123 | 33 |
| 46 | as prepared in Example 12 | 110 | 36 |
| 47 | as prepared in Example 14 | 122 | 29 |
| 48 | as prepared in Example 16 | 117 | 34 |
| 49 | as prepared in Example 24 | 114 | 33 |
| 50 | as prepared in Example 32 | 118 | 33 |
| 51 | as prepared in Example 34 | 123 | 31 |
| 52 | as prepared in Example 35 | 121 | 34 |
| 53 | as prepared in Example 36 | 118 | 33 |
| 54 | resin composition (III) | 116 | 35 |
| 55 | resin composition (IV) | 115 | 34 |

R.T.: Room temperature

What is claimed is:

1. A composite material which comprises reinforcing fibers and an epoxy resin composition comprising the following components:

(A) a bifunctional epoxy resin;

(B) at least one resin selected from the group consisting of a trifunctional epoxy resin and a tetrafunctional epoxy resin;

(C) a dihydroxybiphenyl compound of the formula:

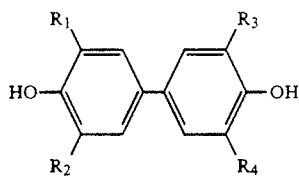

wherein $R_1$–$R_4$ each may be the same or different and each represents a hydrogen atom or an alkyl group of 1 to 6 carbon atoms; and (D) 4,4'-diaminodiphenylsulfone or 3,3'-diaminodiphenylsulfone;

wherein said epoxy resin composition comprises a preliminary reaction product obtained by allowing said component (C) to react initially with all or part of component (A) and all of component (B) under the condition that at least 80% of the phenolic hydroxyl groups in component (C) react with the epoxy groups in components (A) and (B), the proportions of components (A), (B) and (C) to be used in the preliminary reaction satisfying the conditions:

$$1/0.3 \geq a/b \geq 1/3.0$$

$$5/1 \geq (a+b)/c \geq 0.9/1,$$

and the proportions of components (A), (B), (C) and (D) in the total epoxy resin composition satisfy the conditions:

$$1/0.1 \geq a/b \geq 1/1.2$$

$$10/1 \geq (a+)/c \geq 1/1$$

$$1/0.8 \geq (a+b-c)/d \geq 1/1.5$$

wherein a represents the molar number of epoxy groups in component (A), b represents the molar number of epoxy groups in component (B), c represents the molar number of phenolic OH groups in component (C) and d represents the molar number of NH groups in component (D).

2. The composite material as in claim 1, wherein said bifunctional epoxy resin of component (A) is a bisphenol A epoxy resin or a bisphenol F epoxy resin.

3. The composite material as in claim 1, wherein said component (B) is at least one member selected from group consisting of N,N,O-triglycidyl-p-aminophenol, N,N,O-triglycidyl-m-aminophenol, N,N,O-triglycidyl-4-amino-m-cresol, N,N,O-triglycidyl-5-amino-o-cresol, 1,1,1-(triglycidyloxyphenyl)methane, N,N,N',N'-tetraglycidyldiaminodiphenylmethane,N,N,N',N'-tetraglycidyl-4,4'-(4-aminophenyl)-p-diisopropylbenzene, and 1,1,2,2-(tetraglycidyloxyphenyl)ethane.

4. The composite material as in claim 1, wherein said dihydroxy biphenyl compound of component (C) is 4,4'-dihydroxybiphenyl or 4,4'-dihydroxy-3,3',5,5'-tetra-tert-butylbiphenyl.

* * * * *